(12) United States Patent
Ryoo et al.

(10) Patent No.: US 11,616,429 B2
(45) Date of Patent: Mar. 28, 2023

(54) DRIVING ASSEMBLY WITH TWO DRIVING SOURCES AND DRIVING SYSTEM INCLUDING THEREOF

(71) Applicant: TDK TAIWAN CORP., Taoyuan (TW)

(72) Inventors: Jungsuck Ryoo, Taoyuan (TW); Chao-Chang Hu, Taoyuan (TW); Shu-Shan Chen, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 342 days.

(21) Appl. No.: 16/900,036

(22) Filed: Jun. 12, 2020

(65) Prior Publication Data

US 2021/0033816 A1 Feb. 4, 2021

Related U.S. Application Data

(60) Provisional application No. 62/882,165, filed on Aug. 2, 2019.

(51) Int. Cl.
| | |
|---|---|
| *H02K 41/035* | (2006.01) |
| *H02K 11/215* | (2016.01) |
| *H02N 2/04* | (2006.01) |
| *H02N 2/06* | (2006.01) |
| *G02B 27/64* | (2006.01) |
| *H04N 5/232* | (2006.01) |
| *G02B 7/04* | (2021.01) |

(52) U.S. Cl.
CPC .......... *H02K 41/0356* (2013.01); *G02B 27/64* (2013.01); *H02K 11/215* (2016.01); *H02N 2/043* (2013.01); *H02N 2/062* (2013.01); *H04N 5/23248* (2013.01); *G02B 7/04* (2013.01); *G02B 27/646* (2013.01)

(58) Field of Classification Search
CPC .. H02K 41/0356; H02K 11/215; H02N 2/043; H02N 2/062; H04N 5/23248; H04N 5/2257; H04N 5/23287; G02B 27/64; G02B 27/646; G02B 7/04; G02B 7/08
See application file for complete search history.

(56) References Cited

U.S. PATENT DOCUMENTS

| | | | | | |
|---|---|---|---|---|---|
| 5,589,723 | A | * | 12/1996 | Yoshida | .................. H02N 2/025 310/323.02 |
| 6,232,697 | B1 | * | 5/2001 | Mizumoto | ............. H02N 2/067 310/317 |

\* cited by examiner

*Primary Examiner* — Emily P Pham

(74) *Attorney, Agent, or Firm* — Muncy, Geissler, Olds & Lowe, P.C.

(57) ABSTRACT

A driving assembly is provided, including a transmission element and a first driving source. The transmission element has a first connecting point. The first driving source outputs a first driving force to the transmission element. The first driving source is at least partially fixedly connected to the transmission element at the first connecting point.

19 Claims, 7 Drawing Sheets

DRIVING ASSEMBLY WITH TWO DRIVING SOURCES AND DRIVING SYSTEM INCLUDING THEREOF

CROSS-REFERENCE TO RELATED APPLICATIONS

The present application claims priority to U.S. Provisional Patent Application No. 62/882,165, filed on Aug. 2, 2019, the entirety of which is incorporated by reference herein.

BACKGROUND OF THE DISCLOSURE

Field of the Disclosure

The present disclosure relates to a driving assembly and a driving system. More specifically, the present disclosure relates to a driving assembly for driving an optical element.

Description of the Related Art

As the relevant technologies have developed, many electronic devices (such as cameras and smartphones) can record images and videos. However, when zooming or focusing an optical element (such as a lens), there are problems of slow response, imprecise zooming or focusing, and poor efficiency, which are unfavorable to consumers. Therefore, the development of a driving assembly and a driving system allow an optical element driving mechanism to effectively drive the optical element is an important issue.

BRIEF SUMMARY OF THE DISCLOSURE

To solve the problems of the prior art, a driving assembly is provided, including a transmission element, and a transmission element. The transmission element has a first connection point. The first driving source outputs a first driving force to the transmission element. The first driving source is at least partially fixedly connected to the transmission element at the first connection point.

In one of the embodiments of the present disclosure, the driving assembly further includes a second driving source, outputting a second driving force to the transmission element. The transmission element further includes a second connection point. The second driving source is at least partially fixedly connected to the transmission element at the second connection point. The second driving source is at least partially fixedly connected to the first driving source via the transmission element. The first driving source is not directly connected to the second driving source.

In one of the embodiments of the present disclosure, the first driving source, the second driving source and the transmission element at least partially overlap when viewed from a first direction along which the first driving source and the second driving source are arranged. The first driving source and the second driving source are located on opposite sides of the transmission element. The transmission element has an elongated structure, and the transmission element extends in the first direction.

In one of the embodiments of the present disclosure, the transmission element is connected to the first driving source via a first adhesive element. The first driving source includes a first piezoelectric element and a first elastic element. The first elastic element is disposed on the first piezoelectric element. The first elastic element is connected to the first piezoelectric element via a second adhesive element. A first rigidity of the first adhesive element is different from a second rigidity of the second adhesive element. The first rigidity is greater than the second rigidity.

In one of the embodiments of the present disclosure, the transmission element is connected to the second driving source via a third adhesive element. The second driving source includes a second piezoelectric element and a second elastic element. The second elastic element is disposed at the second piezoelectric element. The second elastic element is connected to the second piezoelectric element via a fourth adhesive element. A third rigidity of the third adhesive element is different from a fourth rigidity of the fourth adhesive element. The third rigidity is greater than the fourth rigidity, the first rigidity is greater than the fourth rigidity, and the third rigidity is greater than the second rigidity. The first rigidity is substantially equal to the third rigidity, and the second rigidity is substantially equal to the fourth rigidity.

In one of the embodiments of the present disclosure, the driving assembly is matched with a control system. The control system includes a sensing element and a control unit. The sensing element outputs a sensing signal. The control unit receives the sensing signal and outputs a first control signal to the first driving source. The control unit outputs a second control signal to the second driving source.

In one of the embodiments of the present disclosure, in a first time point, the first driving source drives the first connection point to move in a second direction after receiving the first control signal. The second driving source drives the second connection point to move along the second direction after receiving the second control signal. At the first time point, a first moving direction of the first connection point driven by the first driving source after receiving the first control signal is not opposite to a second moving direction of the second connection point driven by the second driving source after receiving the second control signal. The first control signal has a first frequency, and the first frequency is lower than a first resonance frequency of the first driving source. The second control signal has a second frequency, and the second frequency is lower than a second resonance frequency of the second driving source. The second frequency is lower than the resonance frequency of the driving assembly. The first frequency is different from the second frequency. The first resonance frequency is different from a second resonance frequency of the second driving source. The first frequency is lower than a resonance frequency of the driving assembly.

In one of the embodiments of the present disclosure, the driving assembly further includes a first mode, a second mode, and a third mode. In the first mode, a first power of the first control signal is lower than a second power of the second control signal. In the second mode, the first power of the first control signal is substantially equal to the second power of the second control signal. In the third mode, the first power of the first control signal is greater than the second power of the second control signal.

In one of the embodiments of the present disclosure, in the first mode, the absolute value of the maximum value of a first voltage of the first control signal is smaller than the absolute value of the maximum value of a second voltage of the second control signal. In the second mode, the absolute value of the maximum value of the first voltage of the first control signal is substantially equal to the absolute value of the maximum value of the second voltage of the second control signal. In the third mode, the absolute value of the maximum value of the first voltage of the first control signal is greater than the absolute value of the maximum value of the second voltage of the second control signal.

In one of the embodiments of the present disclosure, in the first mode, the maximum value of a first frequency of the first control signal is smaller than the maximum value of a second frequency of the second control signal. In the second mode, the maximum value of the first frequency of the first control signal is substantially equal to the maximum value of the second frequency of the second control signal. In the third mode, the maximum value of the first frequency of the first control signal is greater than the maximum value of the second frequency of the second control signal.

To solve the problems of the prior art, a driving system is provided, including a driving assembly and a control system. The driving assembly is matched with the control system, and the control system includes a sensing element and a control unit. The sensing element outputs a sensing signal. The control unit receives the sensing signal and outputting a first control signal to the first driving source. The control unit outputs a second control signal to the second driving source.

BRIEF DESCRIPTION OF THE DRAWINGS

The preferred embodiments are exemplified below and described in detail with the accompanying drawings, so as to make the aforementioned and other purposes, features, and advantages of this disclosure more comprehensible, wherein.

It will be appreciated that elements in the figures are illustrated for simplicity and clarity and have not necessarily been drawn to scale. For example, the dimensions of some of the elements in the figures may be exaggerated relative to other elements to help improve understanding of illustrated embodiments of the present disclosure.

DETAILED DESCRIPTION OF THE DISCLOSURE

The making and using of optical element driving mechanisms of embodiments of the present disclosure are discussed in detail below. It should be appreciated, however, that the embodiments provide many applicable inventive concepts that can be embodied in a wide variety of specific contexts. The specific embodiments discussed are merely illustrative of specific ways to make and use the embodiments and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. Still further, when a number or a range of numbers is described with "about," "approximate," "substantially," "generally" and the like, the term is intended to encompass numbers that are within ±10% of the number described, unless otherwise specified. For example, the term "about 5 mm" encompasses the dimension range from 4.5 mm to 5.5 mm. Moreover, as discussed herein, the phrases "about the same," "similarly," "substantially the same" "generally the same" may refer to a dimension having variations within ±10% of the base dimension.

Figure 1:
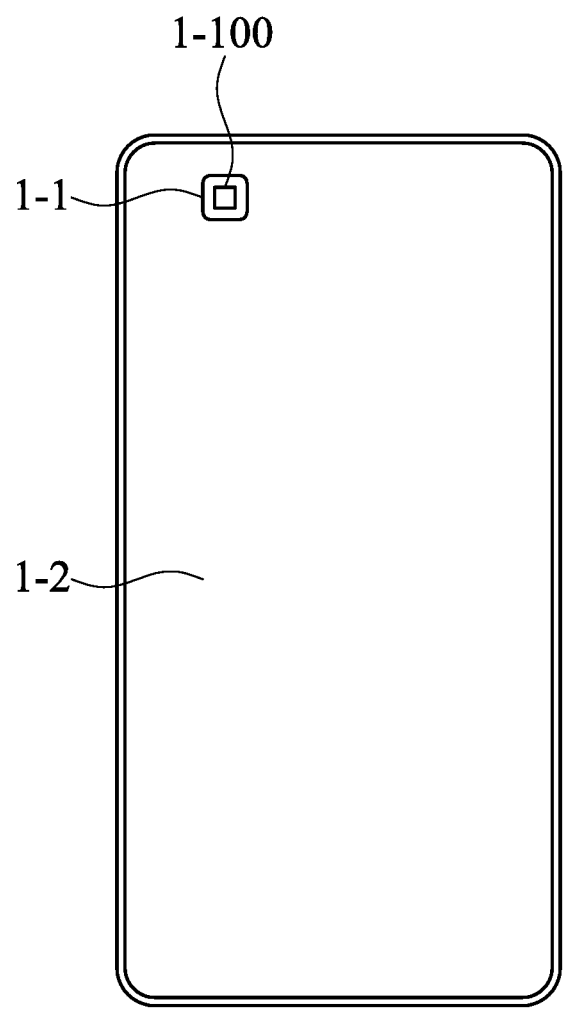
FIG. 1 shows an electronic device having a driving assembly mounted within an optical element driving mechanism, according to an embodiment of the present disclosure.

Firstly, please refer to FIG. 1, an driving assembly 1-100 of an embodiment of the present disclosure may be mounted in an optical element driving mechanism 1-1 for driving an optical element. Moreover, the optical element driving mechanism 1-1 may be mounted within an electrical device 1-2 for taking photos or videos, wherein the aforementioned electrical device 1-2 may, for example, be a smartphone or a digital camera, but the present disclosure is not limited to these. It should be noted that the position and the size between the driving assembly 1-100, the optical element driving mechanism 1-1 and the electrical device 1-2 shown in FIG. 1 are only an example, which is not for limiting the position and the size between the driving assembly 1-100, the optical element driving mechanism 1-1 and the electrical device 1-2. In fact, according to different needs, the driving assembly 1-100 may be mounted at different positions in the optical element driving mechanism 1-1, and the optical element driving mechanism 1-1 may be mounted at different positions in the electrical device 1-2.

Figure 2:
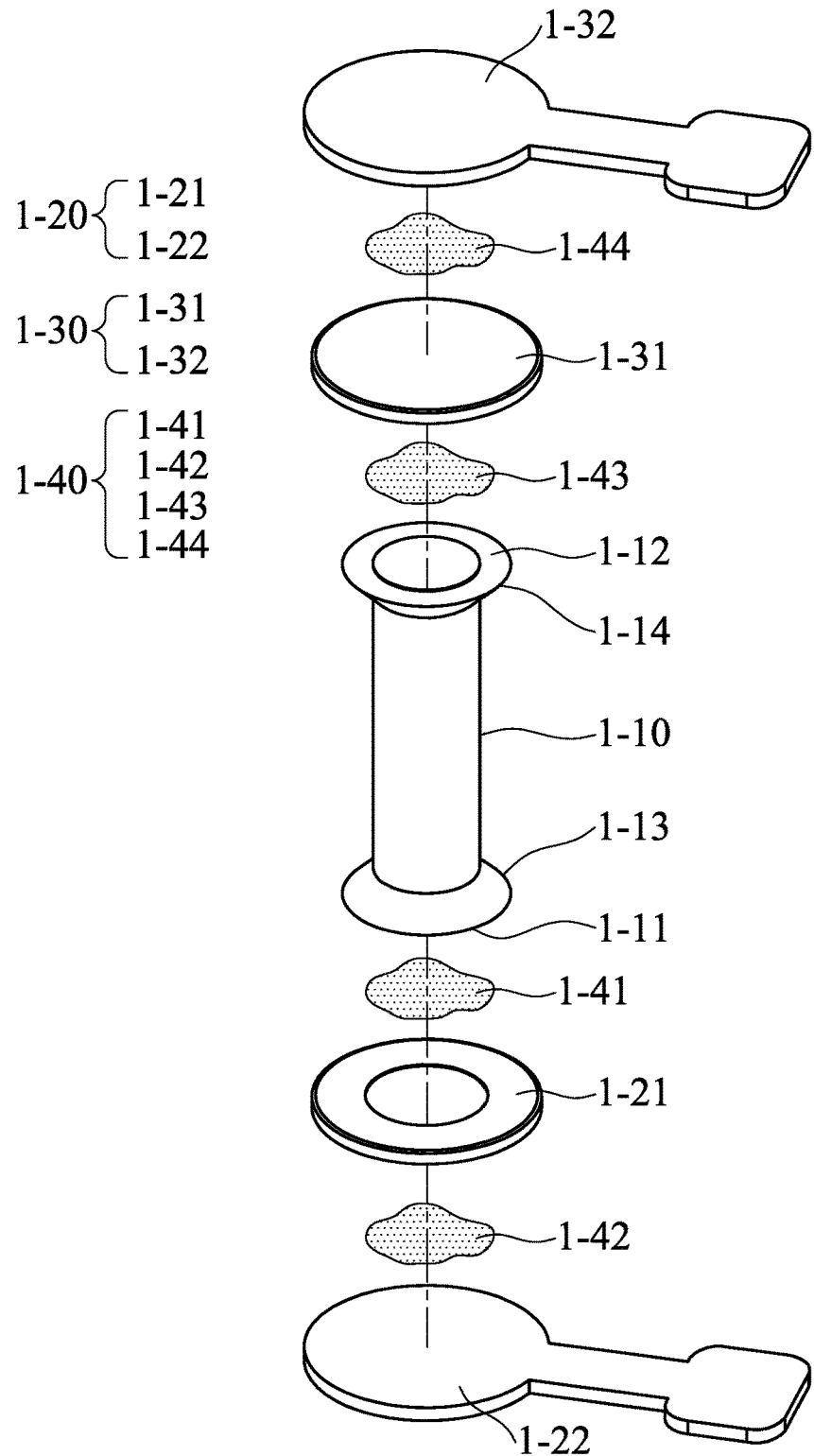
FIG. 2 is an exploded view of the driving assembly according to an embodiment of the present disclosure.

Please refer to FIG. 2, the driving assembly 1-100 includes a transmission element 1-10, a first driving source 1-20, a second driving source 1-30 and an adhesive element 1-40. The transmission element 1-10 has a first end 1-11, a second end 1-12, a first connection point 1-13 and a second connection point 1-14. The first driving source 1-20 includes a first piezoelectric element 1-21 and a first elastic element 1-22. The second driving source 1-30 includes a second piezoelectric element 1-31 and a second elastic element 1-32. The adhesive element 1-40 include a first adhesive element 1-41, a second adhesive element 1-42, a third adhesive element 1-43, and a fourth adhesive element 1-44.

Figure 3:
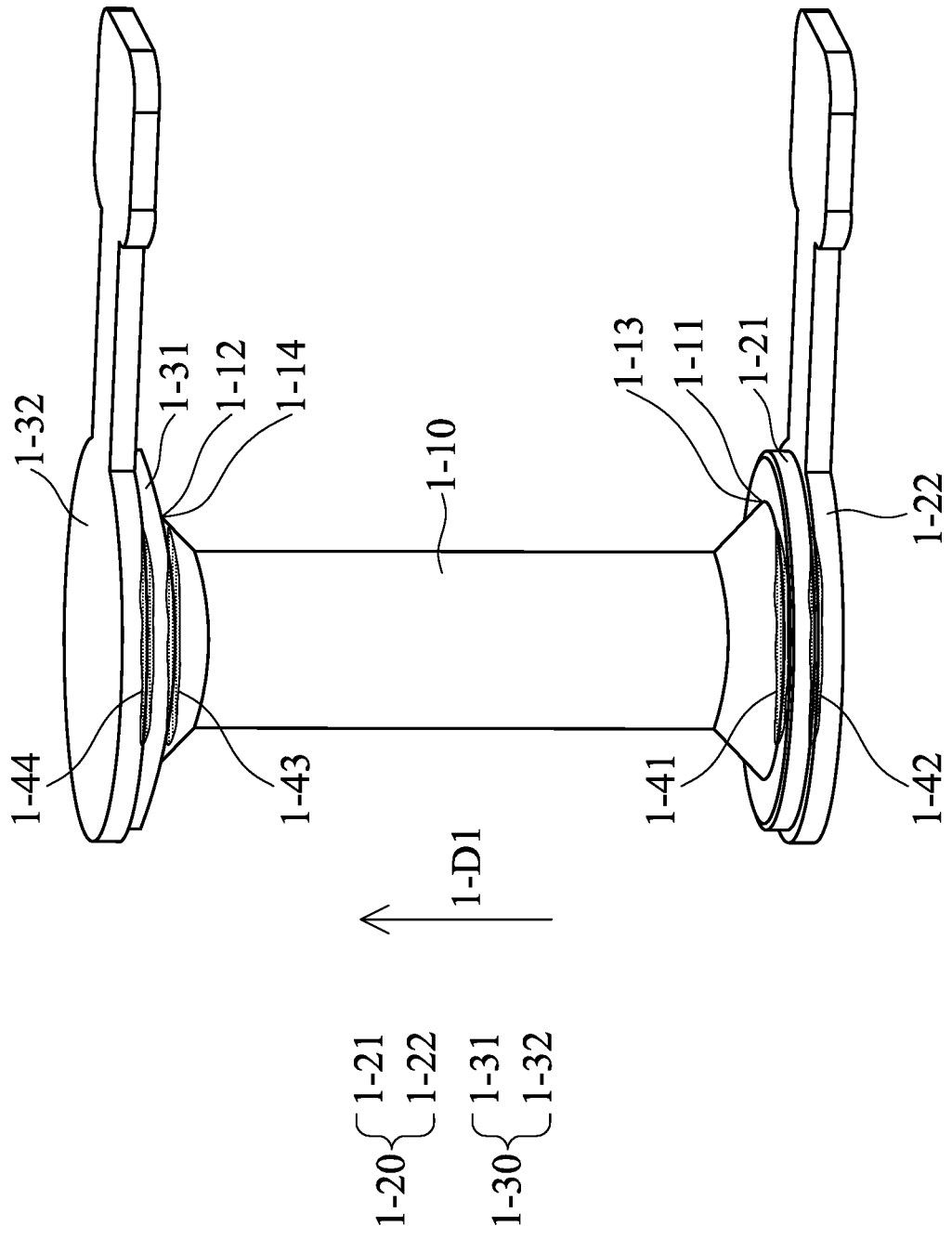
FIG. 3 is a perspective view of the driving assembly according to an embodiment of the present disclosure.

Please refer to FIG. 3, the transmission element 1-10 has an elongated structure, and the transmission element 1-10 extends in a first direction 1-D1. The first connection point 1-13 is adjacent to the first end 1-11, and the second connection point 1-14 is adjacent to the second end 1-12. In other words, the shortest distance between the first connection point 1-13 and the first end 1-11 is smaller than the shortest distance between the first connection point 1-13 and the second end 1-12; moreover, the shortest distance between the second connection point 1-14 and the first end 1-11 is greater than the shortest distance between the second connection point 1-14 and the second end 1-12. The first driving source 1-20 is at least partially fixedly connected to the transmission element 1-10 at the first connection point 1-13 to output a first driving force to the transmission element 1-10. The second driving source 1-30 is at least partially fixedly connected to the transmission element 1-10 at the second connection point 1-14 to output a second driving force to the transmission element 1-10. It should be noted that the first driving source 1-20 is not directly connected to the second driving source 1-30. In fact, the first driving source 1-20 is at least partially fixedly connected to the second driving source 1-30 via the transmission element 1-10. Moreover, the first driving source 1-20 and the second driving source 1-30 are respectively located on opposite sides of the transmission element 1-10. The first driving source 1-20 and the second driving source 1-30 are arranged along the first direction 1-D1. In other words, the first driving source 1-20, the second driving source 1-30 and the transmission element 1-10 at least partially overlap when viewed from the first direction 1-D1 along which the first driving source 1-20 and the second driving source 1-30 are arranged.

In the embodiment shown in FIG. 3, the first piezoelectric element 1-21 is disposed on the first elastic element 1-22, and the second elastic element 1-32 is disposed on the second piezoelectric element 1-31. That is, the first piezoelectric element 1-21 is located between the transmission element 1-10 and the first elastic element 1-22, and the second piezoelectric element 1-31 is located between the transmission element 1-10 and the second elastic element 1-32.

However, in other embodiments (not shown), the first elastic element 1-22 may be disposed on the first piezoelectric element 1-21, and the second piezoelectric element 1-31 may be disposed on the second the elastic element 1-32. In other words, the first elastic element 1-22 may be located between the transmission element 1-10 and the first piezoelectric element 1-21, and the second elastic element 1-32 may be located between the transmission element 1-10 and the second piezoelectric element 1-31.

Please refer to FIG. 3, the transmission element 1-10 is connected to the first driving source 1-20 via the first adhesive element 1-41. The first piezoelectric element 1-21 is connected to the first elastic element 1-22 via the second adhesive element 1-42. The transmission element 1-10 is also connected to the second driving source 1-30 via a third adhesive element 1-43. The second piezoelectric element 1-31 is connected to the second elastic element 1-32 via a fourth adhesive element 1-44.

A first rigidity of the first adhesive element 1-41 is different from a second rigidity of the second adhesive element 1-42, and a third rigidity of the third adhesive element 1-43 is different from a fourth rigidity of the fourth adhesive element 1-44. More specifically, the first rigidity is greater than the second rigidity, the first rigidity is greater than the fourth rigidity, the third rigidity is greater than the second rigidity, the third rigidity is greater than the fourth rigidity, the first rigidity is substantially equal to the third rigidity, and the second rigidity is substantially equal to the fourth rigidity. It should be noted that the first rigidity, the second rigidity, the third rigidity, and the fourth rigidity discussed herein may be the strain coefficients of the adhesive elements.

Figure 4:
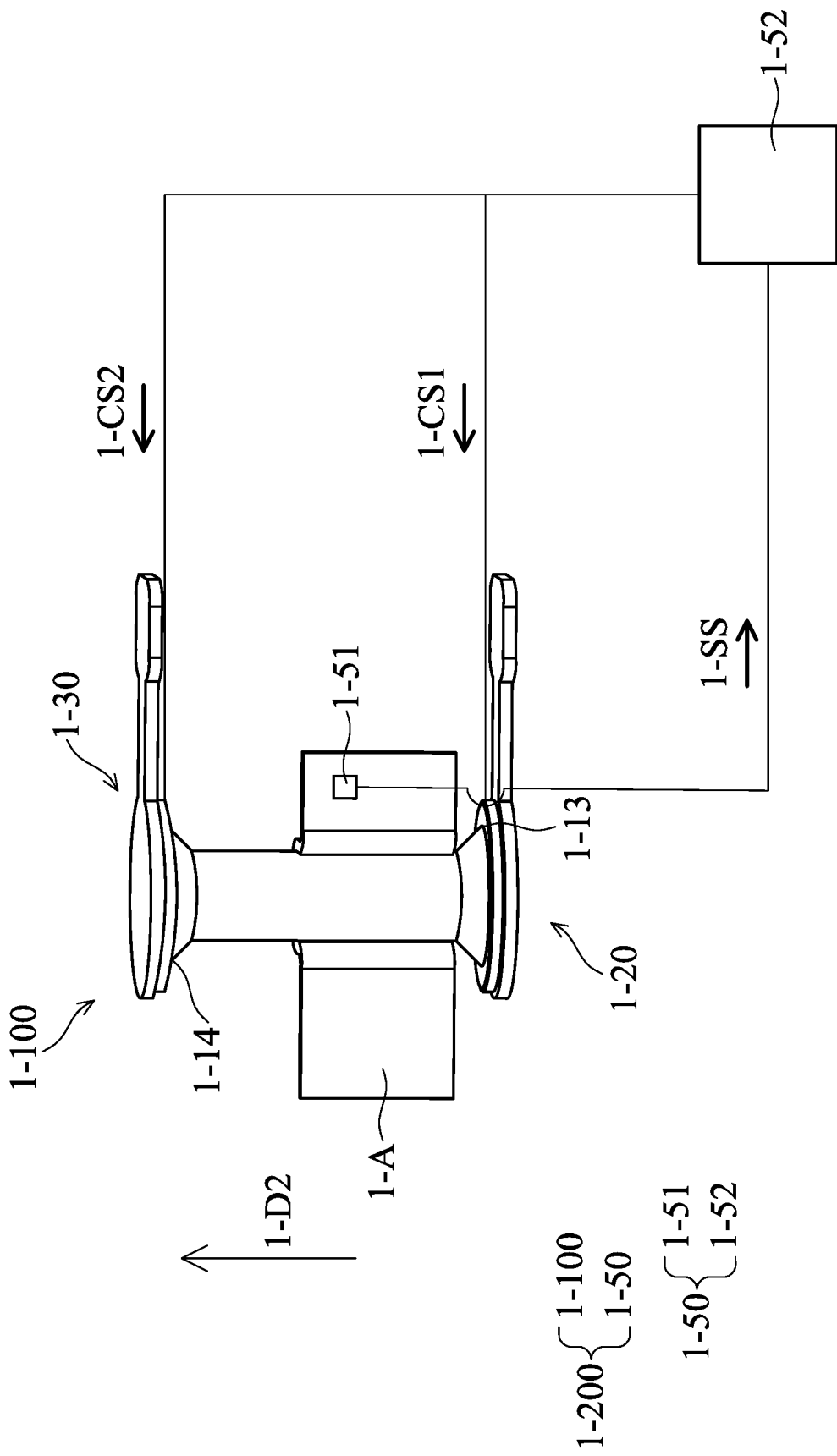
FIG. 4 is a perspective view of a driving system according to an embodiment of the present disclosure.

Please refer to FIG. 4, a driving system 1-200 of one embodiment of the present disclosure includes the driving assembly 1-100 and a control system 1-50. The control system 1-50 includes a sensing element 1-51 and a control unit 1-52.

The driving assembly 1-100 is matched with the control system 1-50. The sensing element 1-51 of the control system 1-50 may be disposed on an external element 1-A (the external element 1-A may be connected to the optical element) connected to the transmission member 1-10, to sense the displacement of the external element 1-A, and the sensing element 1-51 outputs a sensing signal 1-SS (shown as an arrow) to the control unit 1-52. The control unit 1-52 outputs a first control signal 1-CS1 (shown as an arrow) to the first driving source 1-20 and outputs a second control signal 1-CS2 (shown as an arrow) to the second driving source 1-30 after receiving the sensing signal 1-SS. The first control signal 1-CS1 and the second control signal 1-CS2 discussed herein may be voltage signals.

The first driving source 1-20 drives the first connection point 1-13 to move after the first driving source 1-20 receives the first control signal 1-CS1. The second driving source 1-30 drives the second connection point 1-14 to move after the second driving source 1-30 receives the second control signal 1-CS2. Furthermore, at the same time point, a first moving direction of the movement of the first connection point 1-13 driven by the first driving source 1-20 is not opposite to a second moving direction of the movement of the second connection point 1-14 driven by the second driving source 1-30. In other words, at a first time point, the first moving direction is not opposite to the second moving direction. More specifically, in the embodiment shown in FIG. 4, at the first time point, the first driving source 1-20 drives the first connection point 1-13 to move in a second direction 1-D2 after receiving the first control signal 1-CS1; moreover, at the first time point, the second driving source 1-30 drives the second connection point 1-14 to move along the second direction 1-D2 after receiving the second control signal 1-CS2.

The driving assembly 1-100 has a resonance frequency. The first driving source 1-20 has a first resonance frequency, and the second driving source 1-30 has a second resonance frequency. The first resonance frequency is different from the second resonance frequency. The first control signal 1-CS1 has a first frequency, the second control signal 1-CS2 has a second frequency, and the first frequency is different from the second frequency.

In one embodiment, the first frequency is lower than the first resonance frequency, and the second frequency is lower than the second resonance frequency. Therefore, the first control signal 1-CS1 and the second control signal 1-CS2 may enable the first driving source 1-20 and the second driving source 1-30 to drive the transmission element 1-10 more efficiently.

In one embodiment, the first frequency is lower than the resonance frequency, and the second frequency is lower than the resonance frequency. Therefore, the first control signal 1-CS1 and the second control signal 1-CS2 may enable the first driving source 1-20 and the second driving source 1-30 to drive the transmission element 1-10 more efficiently.

Figure 5:
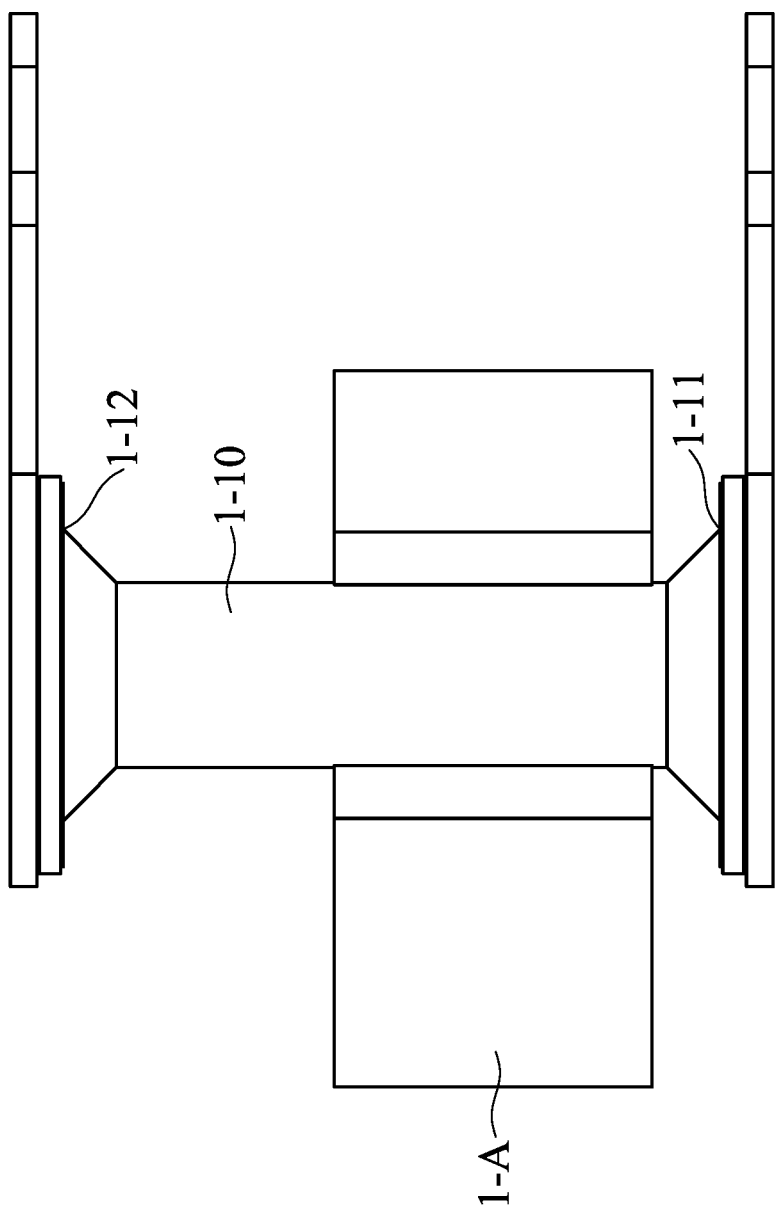
FIG. 5 shows the driving assembly in a first mode according to an embodiment of the present disclosure.
Figure 6:
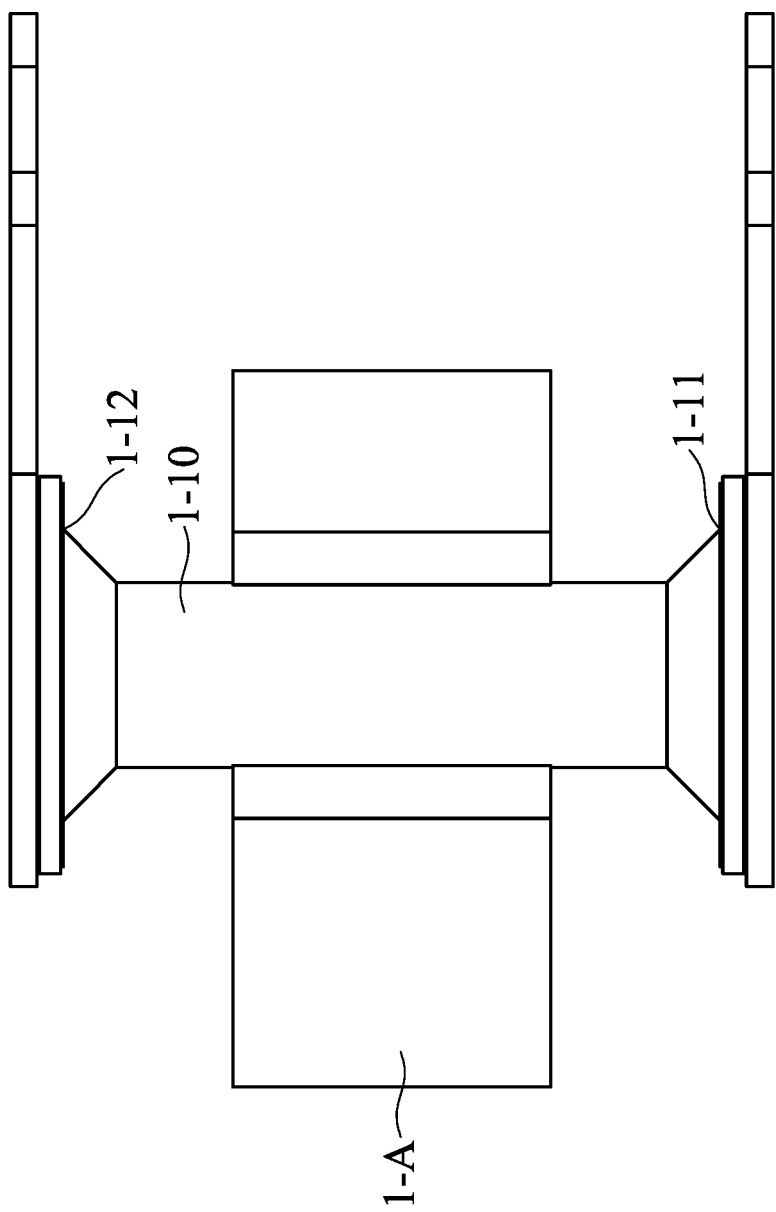
FIG. 6 shows the driving assembly in a second mode according to an embodiment of the present disclosure.
Figure 7:
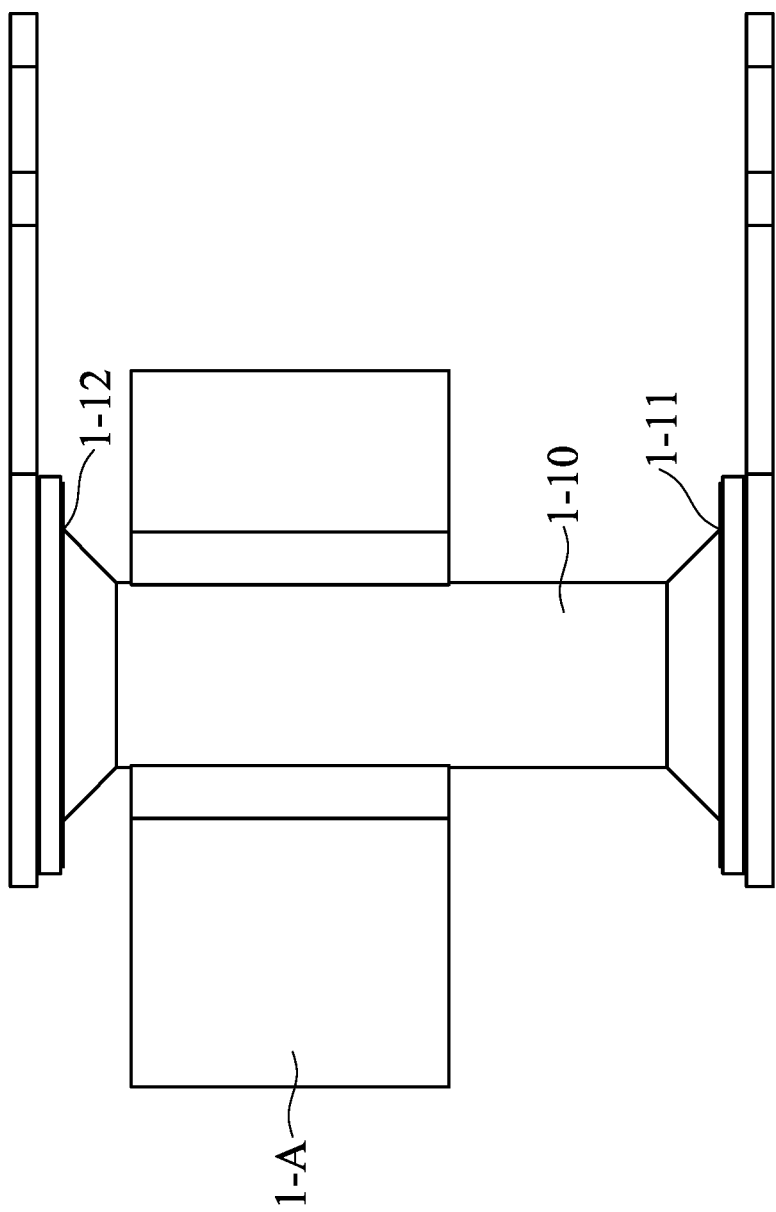
FIG. 7 shows the driving assembly in a third mode according to an embodiment of the present disclosure.

Please refer to FIG. 5 to FIG. 7, the driving system 1-200 further includes a first mode, a second mode, and a third mode.

Please refer to FIG. 5, in the first mode, the external element 1-A connected to the transmission element 1-10 is adjacent to the first end 1-11 of the transmission element 1-10 (the distance between the external element 1-A and the first end 1-11 is smaller than the distance between the external element 1-A and the second end 1-12).

Please refer to FIG. 6, in the second mode, the external element 1-A connected to the transmission element 1-10 is substantially located in the middle of the transmission element 1-10 (the distance between the external element 1-A and the first end 1-11 is substantially equal to the distance between the external element 1-A and the second end 1-12).

Please refer to FIG. 7, in the third mode, the external element 1-A connected to the transmission element 1-10 is adjacent to the second end 1-12 of the transmission element 1-10 (the distance between the external element 1-A and the first end 1-11 is greater than the distance between the external element 1-A and the second end 1-12).

In one embodiment, in the first mode, a first power of the first control signal 1-CS1 is lower than a second power of the second control signal 1-CS2. In the second mode, the first power of the first control signal 1-CS1 is substantially equal to the second power of the second control signal 1-CS2. In the third mode, the first power of the first control signal 1-CS1 is greater than the second power of the second control signal 1-CS2. Therefore, the transmission element 1-10 may be controlled with more efficiency, and the transmission element 1-10 may extend more efficiently to drive the optical element.

In one embodiment, in the first mode, the absolute value of the maximum value of a first voltage of the first control signal 1-CS1 is smaller than the absolute value of the maximum value of a second voltage of the second control signal 1-CS2. In the second mode, the absolute value of the maximum value of the first voltage of the first control signal 1-CS1 is substantially equal to the absolute value of the maximum value of the second voltage of the second control signal 1-CS2. In the third mode, the absolute value of the maximum value of the first voltage of the first control signal 1-CS1 is greater than the absolute value of the maximum value of the second voltage of the second control signal 1-CS2. Therefore, the transmission element 1-10 may be controlled with more efficiency, and the transmission element 1-10 may extend with more efficiency to drive the optical element.

In one embodiment, in the first mode, the maximum value of the first frequency of the first control signal 1-CS1 is smaller than the maximum value of the second frequency of the second control signal 1-CS2. In the second mode, the maximum value of the first frequency of the first control signal 1-CS1 is substantially equal to the maximum value of the second frequency of the second control signal 1-CS2. In the third mode, the maximum value of the first frequency of the first control signal 1-CS1 is greater than the maximum value of the second frequency of the second control signal 1-CS2. Therefore, the transmission element 1-10 may be controlled with more efficiency, and the transmission element 1-10 may extend with more efficiency to drive the optical element.

In summary, the driving assemblies and the driving systems disclosed in the embodiments of the present disclosure may control the transmission element with more efficiency by providing control signals with different power, voltage or frequencies to the first driving source or the second driving source. Furthermore, compared to the conventional driving assemblies and driving systems, the driving assemblies and the driving systems disclosed in the embodiments of the present disclosure may drive external elements or optical elements more quickly, and may move external elements or optical elements to desire positions more precisely.

Although embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, the scope of the present disclosure is defined by the scope of the appended claims. In addition, each scope of the claims is constructed as a separate embodiment, and various combinations of the claims and combinations of embodiments are within the scope of the present disclosure.

What is claimed is:

1. A driving assembly, comprising:
   a transmission element, having a first connection point;
   a first driving source, outputting a first driving force to the transmission element, and
   a second driving source, outputting a second driving force to the transmission element, wherein the transmission element further comprises a second connection point,
   wherein the first driving source is at least partially fixedly connected to the transmission element at the first connection point,
   wherein the second driving source is at least partially fixedly connected to the transmission element at the second connection point,
   wherein the second driving source is at least partially fixedly connected to the first driving source via the transmission element,
   wherein the first driving source is not directly connected to the second driving source.

2. The driving assembly as claimed in claim 1, wherein the first driving source, the second driving source and the transmission element at least partially overlap when viewed from a first direction along which the first driving source and the second driving source are arranged.

3. The driving assembly as claimed in claim 1, wherein the first driving source and the second driving source are located on opposite sides of the transmission element;
   the transmission element has an elongated structure, and the transmission element extends in the first direction.

4. The driving assembly as claimed in claim 1, wherein the transmission element is connected to the first driving source via a first adhesive element,
   the first driving source comprises:
   a first piezoelectric element; and
   a first elastic element, disposed on the first piezoelectric element, wherein the first elastic element is connected to the first piezoelectric element via a second adhesive element;
   wherein a first rigidity of the first adhesive element is different from a second rigidity of the second adhesive element,
   wherein the first rigidity is greater than the second rigidity.

5. The driving assembly as claimed in claim 4, wherein the transmission element is connected to the second driving source via a third adhesive element,
the second driving source comprises:
a second piezoelectric element; and
a second elastic element, disposed at the second piezoelectric element, wherein the second elastic element is connected to the second piezoelectric element via a fourth adhesive element,
wherein a third rigidity of the third adhesive element is different from a fourth rigidity of the fourth adhesive element.

6. The driving assembly as claimed in claim 5, wherein the third rigidity is greater than the fourth rigidity, the first rigidity is greater than the fourth rigidity, and the third rigidity is greater than the second rigidity.

7. The driving assembly as claimed in claim 5, wherein the first rigidity is substantially equal to the third rigidity, and the second rigidity is substantially equal to the fourth rigidity.

8. The driving assembly as claimed in claim 1, matched with a control system,
wherein the control system comprise:
a sensing element, outputting a sensing signal; and
a control unit, receiving the sensing signal and outputting a first control signal to the first driving source,
wherein the control unit outputs a second control signal to the second driving source.

9. The driving assembly as claimed in claim 8, wherein in a first time point, the first driving source drives the first connection point to move in a second direction after receiving the first control signal,
the second driving source drives the second connection point to move along the second direction after receiving the second control signal.

10. The driving assembly as claimed in claim 9, wherein at the first time point, a first moving direction of the first connection point driven by the first driving source after receiving the first control signal is not opposite to a second moving direction of the second connection point driven by the second driving source after receiving the second control signal.

11. The driving assembly as claimed in claim 8, wherein the first control signal has a first frequency, and the first frequency is lower than a first resonance frequency of the first driving source.

12. The driving assembly as claimed in claim 11, wherein the second control signal has a second frequency, and the second frequency is lower than a second resonance frequency of the second driving source.

13. The driving assembly as claimed in claim 12, wherein the second frequency is lower than a resonance frequency of the driving assembly;
the first frequency is different from the second frequency.

14. The driving assembly as claimed in claim 11, wherein the first resonance frequency is different from a second resonance frequency of the second driving source.

15. The driving assembly as claimed in claim 11, wherein the first frequency is lower than a resonance frequency of the driving assembly.

16. The driving assembly as claimed in claim 8, further comprising:
a first mode, in which a first power of the first control signal is lower than a second power of the second control signal;
a second mode, in which the first power of the first control signal is substantially equal to the second power of the second control signal; and
a third mode, in which the first power of the first control signal is greater than the second power of the second control signal.

17. The driving assembly as claimed in claim 16, wherein in the first mode, the absolute value of the maximum value of a first voltage of the first control signal is smaller than the absolute value of the maximum value of a second voltage of the second control signal,
in the second mode, the absolute value of the maximum value of the first voltage of the first control signal is substantially equal to the absolute value of the maximum value of the second voltage of the second control signal,
in the third mode, the absolute value of the maximum value of the first voltage of the first control signal is greater than the absolute value of the maximum value of the second voltage of the second control signal.

18. The driving assembly as claimed in claim 16, wherein in the first mode, the maximum value of a first frequency of the first control signal is smaller than the maximum value of a second frequency of the second control signal,
in the second mode, the maximum value of the first frequency of the first control signal is substantially equal to the maximum value of the second frequency of the second control signal,
in the third mode, the maximum value of the first frequency of the first control signal is greater than the maximum value of the second frequency of the second control signal.

19. A driving system, comprising:
the driving assembly as claimed in claim 1; and
a control system,
wherein the driving assembly matched with the control system, and the control system comprises:
a sensing element, outputting a sensing signal; and
a control unit, receiving the sensing signal and outputting a first control signal to the first driving source,
wherein the control unit outputs a second control signal to the second driving source.

* * * * *